S. I. FEKETE.
STOVE FOR INTAKE MANIFOLDS OF INTERNAL COMBUSTION ENGINES.
APPLICATION FILED OCT. 5, 1920.
1,393,994. Patented Oct. 18, 1921.
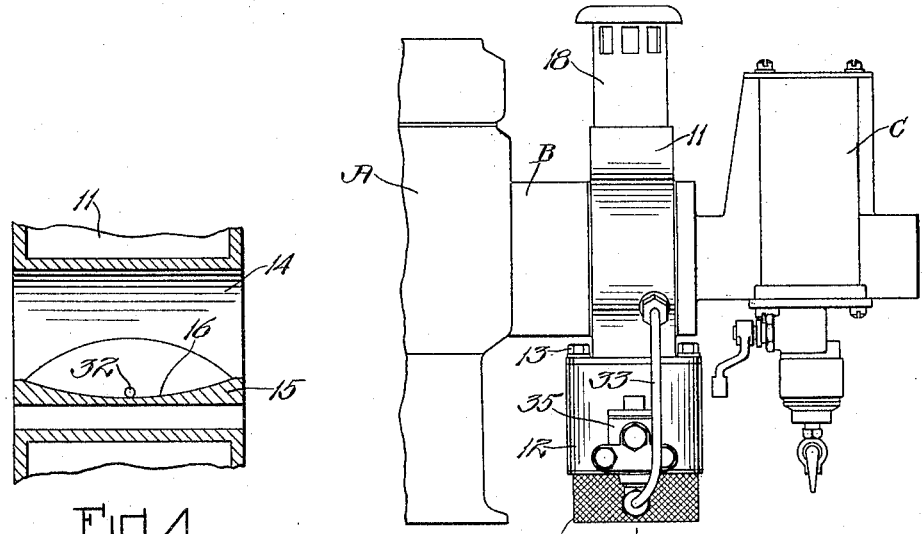
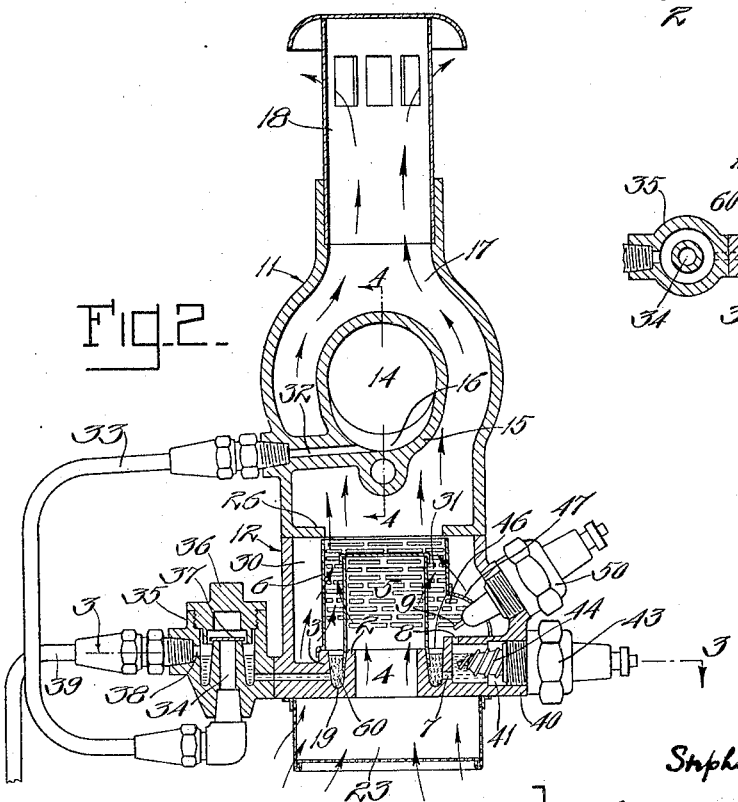
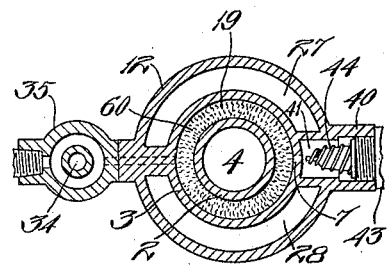
INVENTOR
Stephen Ivan Fekete
by Macklin, Calver, Copeland & Dike
Attys.

UNITED STATES PATENT OFFICE.

STEPHEN IVAN FEKETE, OF DETROIT, MICHIGAN, ASSIGNOR TO ESSEX MOTORS, OF DETROIT, MICHIGAN, A CORPORATION OF MICHIGAN.

STOVE FOR INTAKE-MANIFOLDS OF INTERNAL-COMBUSTION ENGINES.

1,393,994.  Specification of Letters Patent.  Patented Oct. 18, 1921.

Application filed October 5, 1920. Serial No. 414,921.

*To all whom it may concern:*

Be it known that I, STEPHEN I. FEKETE, citizen of Hungary, residing at Detroit, county of Wayne, State of Michigan, have invented a certain new and useful Improvement in Stoves for Intake-Manifolds of Internal-Combustion Engines, of which the following is a specification, reference being had therein to the accompanying drawings.

My present invention provides mechanism for supplying heat to the contents of the inlet manifold of an internal combustion engine, particularly when it is desired to start the engine. As is well understood by those skilled in the art, the present fuel furnished for internal combustion engines vaporizes with difficulty at ordinary atmospheric temperature, and this renders the starting of internal combustion engines very difficult. Furthermore, it takes considerable time after the engine has been started before it warms up sufficiently to run smoothly. It is also well understood that the dilution of the lubricating oil in the crank-case, which is a serious objection to low grade fuel, occurs chiefly immediately after the engine has been started and before it has warmed up, at which time large quantities of the less readily vaporizable portions of the fuel are introduced into the cylinders and pass the piston rings into the crank case.

Such devices as "hot spots" and water-jacketed intake manifolds produce excellent results after the engine has once been started, but do not assist at all in starting the engine.

To obviate these difficulties, so-called fuelizers have been devised. These are the devices which burn a portion of the fuel and introduce the heated products of combustion directly into the stream of mixture which flows through the intake manifold. They are not altogether satisfactory for two reasons; first, because the products of combustion occupy a portion of the space in the cylinders which would otherwise be occupied by the air or the mixture and reduce the power of the engine appreciably; and second, because the devices do not operate with sufficient continuity owing to the clogging of minute ports.

Accordingly, the object of the present invention is to provide practical automatic means for burning in a stove a predetermined quantity of fuel, the resulting heat being applied to the intake manifold before the engine is started and immediately after this has taken place. The device in its preferred form, provides means for supplying to the stove a predetermined quantity of fuel from the unvaporized liquid fuel in the intake manifold and burning the same in the position to heat a portion of the walls of the intake manifold at the point where the unvaporized fuel collects. Since only a predetermined amount of fuel is supplied to the stove, the combustion ceases as soon as the fuel is consumed, and by properly regulating the amount of fuel, the action of the device can be timed to cease as soon as the engine is warmed up enough to operate satisfactorily.

While in my preferred form, the products of combustion are not intermingled with the stream of mixture in the intake manifold, I do not limit myself to this construction. Also, I have shown the stove to be supplied with fuel from the bottom of the inlet manifold, but I do not limit myself to this construction, since it may be obtained from any suitable source of fuel supply about the engine.

The drawings, show the device embodying my invention in the form intended for use for heating the intake manifold, but it may also be used for heating the carbureter if desired.

In using the phrase "intake manifold" in this specification, I intend to refer to the passage leading from the outer air through the carbureter to the cylinders of the engine, without any limitation as to whether the passage be in a carbureter, in the engine block casting, or in a piece intermediate the two.

The invention will be fully understood from the following description when taken in connection with the accompanying drawings, and the novel features thereof will be pointed out and clearly defined in the claims at the close of this specification.

In the drawings, Figure 1 is a side elevation of a portion of an engine and carbureter, the intake manifold of which is provided with a stove embodying my invention.

Fig. 2 is a section on line 2 of Fig. 1.

Fig. 3 is a section on line 3—3 of Fig. 2.
Fig. 4 is a section on line 4—4 of Fig. 2.

Referring now to the drawings, at A is shown a portion of the engine, at B the portion of the casting containing the intake manifold, and at C the carbureter. The stove embodying my invention comprises a unit which is inserted between the carbureter C and the engine A, and increases the length of the intake manifold by a distance equal to the thickness of the unit. This construction is advantageous because it makes it possible to insert the stove between the engine and the carbureter without changing the construction of either the carbureter or the engine in any way whatever.

The body of the stove consists of two sections 11 and 12 secured together by cap screws 13. The upper section 11 of the body is secured to the engine B on one side and to the carbureter C on the other side, and the bore 14 of the intake manifold extends from the carbureter C through the stove into the casting of the engine block. It is to be understood that this construction is a convenient one, but that I do not limit myself to it. The floor 15 of the intake manifold portion of the stove is depressed to form a pocket 16 in which unvaporized fuel will lodge.

Surrounding the intake manifold 14 is a flue 17 capped by a chimney 18 through which the products of combustion pass. These parts are so arranged that the products of combustion surround the portion of the intake manifold which is in the stove so that the flames from the burner, which will now be described, will flow directly onto the underside of the intake manifold and heat the pocket 16 intensely.

In the lower section 12 of the stove is located a fuel pit 19 which is annular in shape and is formed between two walls 2 and 3. At 4 is a central air passage extending up through the burner. Surrounding this central air passage and below it is a gauze cup 23 which serves to extinguish any flame which might otherwise burst out through the bottom of the device. The wall 2 is extended upwardly by a perforated tube 5 through which air can pass from the central passage 4. This tubular perforated member is surrounded by another tubular perforated member 6, which rests at the bottom on the wall 3 and at the top against an inwardly extending flange 26 forming part of the upper section 11 of the stove. There are open spaces 27 and 28, see Fig. 3, one on each side of the fuel pit through which air can pass up into the annular space 30 which surrounds the outer tubular perforated member 6. From the foregoing, it will be seen that the flame generated by the combustion of fuel in the fuel pit is confined in the annular space 31 between the two tubular perforated members 5 and 6 and is fed with air on both sides, the air which is fed to the inside of the flame coming through the hole 4, while that which is fed to the outside of the flame comes up through the holes 27 and 28. This construction insures good combustion of the fuel in the fuel pit and prevents the stove smoking or giving off objectionable odors.

The fuel pit 19 is preferably filled with some fibrous incombustible material 60, such as steel wool, asbestos or the like to assist in the combustion of the fuel and prevent slopping.

The depression 16 in the bottom of the intake manifold 14 is intercepted by a downwardly inclined fuel port 32. This fuel port leads to a pipe 33 which connects with an upwardly extending fuel passage 34 in a valve casing 35 formed on the side of the lower member 12 of the stove. This valve casing 35 is closed by a cap 36 and contains a valve member 37 which permits free flow of fuel through the pipe 33 to the fuel pit, but prevents any ingress of air into the manifold 14. In the drawings, the valve is shown as a thin disk of metal which is so light that it is easily raised by the fuel, but is instantly and tightly closed by the least suction through the intake manifold. The valve casing 35 is provided with an overflow port 38, the bottom of which is just below the level of the upper edge of the fuel pit 19, so that the fuel pit will be filled to the predetermined level, and any surplus fuel will escape through the waste pipe 39. By this arrangement, the surplus fuel is deposited on the ground under the vehicle, or led back to the fuel tank and danger of fire is eliminated. It is to be understood, that an essential feature of this part of the invention is the provision of a fuel pit which will contain only a predetermined quantity of fuel, the discharge of any surplus being accomplished in any suitable manner.

On the side of the lower section 12 of the body of the stove, is located a boss 40 within which is a vaporizing chamber 41 communicating with the fuel pit by ports 7. A vaporizing plug 43 provided with a suitable electrical heating unit 44 closes the chamber 41 in the boss. The vaporizing plug 43 is connected to some suitable source of electrical energy, such as the ignition or starting battery (not shown). The chamber 41 communicates through a port 8 with a space 46 formed by a projection 47 on the outer tubular perforated member 6 already described.

From the foregoing, it will be seen that liquid fuel from the fuel pit 19 passes into the vaporizing chamber 41 and there comes in direct contact with the heating element 44 of the vaporizing plug 43. This heating element is heated to incandescence and vaporizes the fuel in the chamber 41, the fumes rising through the port 8 into the space 46 which forms an extension of the flame space 31 between the two perforated tubes 5 and 6. At 50 is shown an igniting plug screwed into a portion of the boss 40 and having its ignition points 9 located in the flame space 31 and directly above the port 8 through which the vapor generated by the heating element 44 escapes from the vaporizing chamber 41.

The operation of my device is as follows:—During the ordinary running of the internal combustion engine, a certain amount of unvaporized liquid fuel accumulates in the depression 16 in the intake manifold. When the motor stops, this fuel trickles through the part 33 past the valve 37 and fills the fuel pit 19 up to the level determined by the position of the overflow pipe 39. The amount of fuel is therefore accurately determined without any action on the part of the operator of the vehicle. The fuel saturates the fibrous non-combustible material 60 contained in the fuel pit 19, and some of the fuel enters the pocket 41. This action takes place automatically and without the knowledge of the operator of the vehicle. When he desires to start the vehicle, he closes an electrical circuit by means of a switch not shown. This heats the heating element 44 and also produces a spark across the ignition points of the spark plug 50. The vapor arising from the pocket 41 through the port 8 is ignited by the spark from the plug 50 and in turn ignites the fuel in the fuel pit 19. The flames and products of combustion pass upwardly through the flame space 31 and play against the under side 15 of the intake manifold, rendering it intensely hot so that the fuel remaining in the depression 16 and which flows past the depression 16 when the engine is cranked, is instanly vaporized so that it mixes readily with the air, forming a highly explosive vapor with which the engine starts promptly. The stove continues to burn and to heat the intake manifold as long as any fuel remains in the fuel pit. The size of the fuel pit is designed to keep the stove burning long enough for the engine to get thoroughly warmed up so that it will be running evenly and efficiently before the stove goes out. After the fire in the stove has burned itself out, the device is inoperative until it is desired to start the engine again. In the meantime, a new supply of liquid fuel will have accumulated in the fuel pit, but will not have been burned because there is nothing to ignite it until the circuit through the ignition plug 50 is completed by the action of the operator of the vehicle.

From the foregoing, it will be seen that the device is practically automatic in its operation and requires no attention from the operator except to turn on the switch when it is desired to start the engine.

It will further be seen that the device is arranged to produce perfect combustion of the fuel to be burned, and further that the ignition of the vapor takes place at a point well above the fuel pit at a point where the fuel is mixed with air so that there is no danger of the stove failing to light on account of insufficient air.

The quantity of fuel employed in the operation of my improved device is inconsequential because it is fuel which, if not used for this purpose, would be carried through the manifold in an unvaporized condition and would pass through the engine into the muffler without serving any useful purpose.

What I claim is:—

1. In combination with the intake manifold of an internal combustion engine, a stove in position to heat the manifold, and means for supplying an automatically measured quantity of liquid fuel to the stove.

2. In combination with the intake manifold of an internal combustion engine, a stove in position to heat the manifold, means to supply an automatically measured quantity of liquid fuel from the intake manifold to the stove.

3. In combination with the intake manifold of an internal combustion engine, a stove located in position to heat the manifold, means for supplying liquid fuel to the stove, electrical means in the stove to vaporize the fuel therein, and means for igniting the vapor produced by the vaporizer.

4. In combination with the intake manifold of an internal combustion engine, a stove located in position to heat the manifold, means for supplying liquid fuel to the stove, electrical means submerged in the fuel in the stove for vaporizing said fuel, and means for igniting the vaporized fuel.

5. In combination with the intake manifold of an internal combustion engine, a stove located in position to deliver heat to the exterior of the manifold and a passage permitting the flow of liquid fuel from the manifold to the stove.

6. In combination with the intake manifold of an internal combustion engine, a fuel pit communicating with the said manifold, a combustion space above the pit and separated from the space within the manifold by the wall of the manifold, and means for igniting fuel in the fuel pit.

7. In combination with the intake manifold of an internal combustion engine, a stove located to heat the manifold, a fuel pit therein, connections from a source of fuel supply to the pit, said pit having an open top to permit the discharge of surplus fuel, means for heating the fuel in the pit, and means for igniting the vapor therefrom.

8. In combination with the intake manifold of an internal combustion engine, a stove located to heat the manifold, a fuel pit in the stove, said pit having an overflow opening to prevent the accumulation of more than a predetermined amount of fuel therein, and connections from the intake manifold to the fuel pit through which the fuel pit will be supplied with unvaporized fuel from the intake manifold.

9. In combination, an intake manifold of an internal combustion engine having a depression in its floor, a stove located to heat the manifold, a fuel pit in the stove, and a connection from the said depression to the fuel pit whereby the fuel pit will be supplied with unvaporized fuel, collected in the depression in the manifold.

10. In combination, an intake manifold of an internal combustion engine, a stove located to heat the manifold, a passage leading from the manifold to the stove to supply the stove with unvaporized fuel from the manifold, and a check valve in the said passage to prevent air entering the manifold from the stove.

11. In combination with the intake manifold of an internal combustion engine, a stove located in position to heat the manifold, said stove being provided with a fuel pit, an electrical heating element accessible to the fuel in the pit, and electrical igniting means located in position to ignite the vapor generated by the electrical vaporizing means.

12. In combination with the intake manifold of an internal combustion engine, a stove in position to heat the manifold, a fuel pit in said stove, an electrical heating element accessible to the fuel in the pit and a spark plug located above said heating element to ignite the vapor as it rises from the vaporizing element.

13. In combination with the intake manifold of an internal combustion engine, a stove in position to heat the manifold, an annular fuel pit in said stove, a pair of substantially concentric perforated tubular members extending upwardly from the walls of said fuel pit and forming a flame space between them, and electrical ignition means to produce a spark in said flame space.

14. In combination with the intake manifold of an internal combustion engine and a carbureter therefor, a unit insertible between the carbureter and the end of the manifold, which unit contains a passage forming an extension of the intake manifold, a chamber surrounding said extension, and a burner adapted to supply heat to said chamber to heat the walls of said extension.

In testimony whereof I affix my signature.

STEPHEN IVAN FEKETE.